(12) United States Patent
Turpie

(10) Patent No.: US 9,645,808 B1
(45) Date of Patent: May 9, 2017

(54) INTEGRATING SOFTWARE UPDATES WITH THE TESTING AND DEPLOYMENT OF SOFTWARE

(71) Applicant: Amazon Technologies, Inc., Seattle, WA (US)

(72) Inventor: Jonathan Turpie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 13/975,859

(22) Filed: Aug. 26, 2013

(51) Int. Cl.
*G06F 9/445* (2006.01)
*G06F 11/36* (2006.01)

(52) U.S. Cl.
CPC ............ *G06F 8/64* (2013.01); *G06F 11/3672* (2013.01)

(58) Field of Classification Search
None
See application file for complete search history.

(56) References Cited

U.S. PATENT DOCUMENTS

| | | | | |
|---|---|---|---|---|
| 5,742,829 | A * | 4/1998 | Davis ........................ | G06F 8/61 717/178 |
| 2005/0166094 | A1* | 7/2005 | Blackwell ........... | G06F 11/3664 714/38.14 |
| 2005/0257208 | A1* | 11/2005 | Blumfield et al. ............ | 717/168 |
| 2006/0074618 | A1* | 4/2006 | Miller et al. .................... | 703/13 |
| 2006/0080656 | A1* | 4/2006 | Cain et al. .................... | 717/174 |
| 2008/0098309 | A1* | 4/2008 | Fries et al. .................... | 715/734 |
| 2011/0271270 | A1* | 11/2011 | Bowen ......................... | 717/171 |

* cited by examiner

*Primary Examiner* — Lewis A Bullock, Jr.
*Assistant Examiner* — Bruce S Ashley
(74) *Attorney, Agent, or Firm* — Lee & Hayes, PLLC

(57) ABSTRACT

Functionality is disclosed for integrating software updates with the testing and deployment of programs. An automated software testing and deployment component performs automated tests on a program and deploys the tested program to production hosts. The automated software testing and deployment component also receives a list of software updates, such as updates to an operating system upon which the program executes. The automated software testing and deployment component deploys the software updates to test hosts executing the program. The automated tests are then performed on the program executing on the test hosts. If the automated tests pass, the automated software testing and deployment component deploys the software updates to production hosts executing the program. The software updates may be deployed using deployment rules defined for deploying the program to the production hosts.

20 Claims, 7 Drawing Sheets

INTEGRATING SOFTWARE UPDATES WITH THE TESTING AND DEPLOYMENT OF SOFTWARE

BACKGROUND

Many operating systems include integrated functionality for deploying updates to the operating system itself. For example, an operating system manufacturer may periodically issue updates to the operating system that are then deployed to computers executing the operating system. Deployment of the updates may occur automatically or under the manual control of an end user. Computing systems might also be configured to apply updates to non-operating system software in a similar manner.

Under some circumstances the installation of software updates, such as updates to an operating system, can inadvertently cause problems with the operation of other programs. For example, installation of an update to an operating system on a computing device might inadvertently cause problems with the execution of other programs executing on the computing system. In many cases, it is possible to detect such a malfunction only once the software updates have been installed. Moreover, installation of some software updates is not reversible.

In order to avoid the problems described above, some system administrators choose not to permit the automatic installation of software updates, such as updates to an operating system. This type of policy, however, frequently results in unpatched computing systems, which can present security and other types of risks to the users of such computing systems.

The disclosure made herein is presented with respect to these and other considerations.

DETAILED DESCRIPTION

Figure 1:
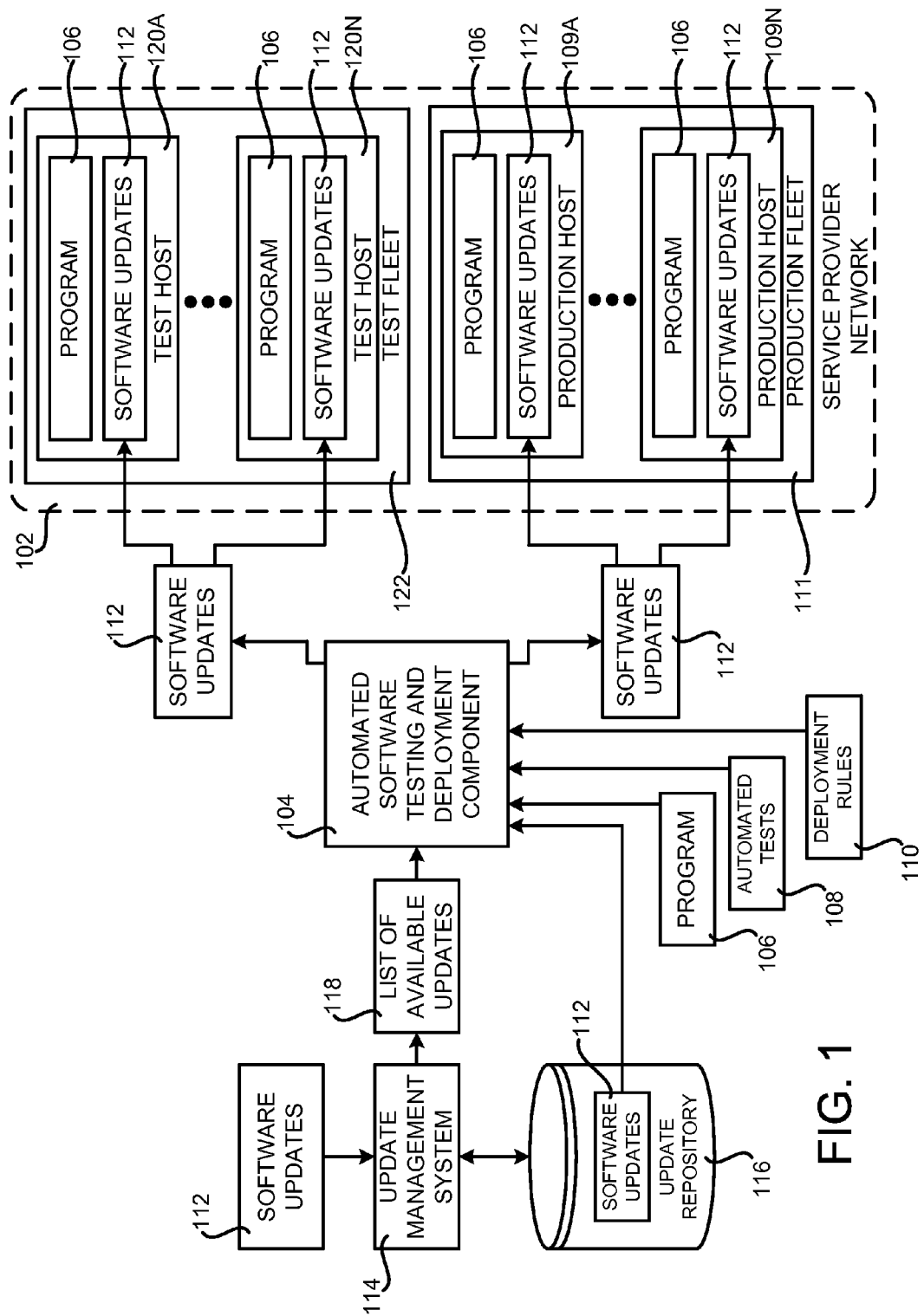
FIG. 1 is a network architecture diagram showing aspects of the operation of one illustrative mechanism disclosed herein for integrating software updates with the testing and deployment of software, according to one embodiment.

The following detailed description is directed to technologies for integrating software updates with the testing and deployment of other software components. Utilizing the technologies described herein, the deployment of software updates, such as updates to an operating system or another type of software component, can be integrated with a build, test and release process that is utilized for other types of software components. In particular, new software updates can be tested with other programs prior to deploying the software updates to production computing devices using the same testing infrastructure utilized to test and deploy the other programs. Moreover, software updates can be tested with other programs and deployed in an automated fashion following the testing, thereby providing the benefits of automated update deployment without the typical risk of incompatibility with existing programs. Additional details regarding these and other aspects presented herein will be described below.

According to embodiments presented herein, computer-implemented mechanisms are disclosed for integrating software updates with the testing and deployment of software. In one embodiment, an automated software testing and deployment component (which may be referred to herein as "the deployment component") provides functionality for testing and deploying programs created by a software developer. For example, a software developer may create a software program along with one or more automated tests for testing the operation of the program. The developer might also specify one or more deployment rules that specify the manner in which the program is to be deployed to production hosts following testing.

The deployment component is configured to deploy the program to one or more test hosts. Test hosts are computers or virtual machine instances that are configured to execute the program and to perform the automated tests on the program. The test hosts are not typically utilized to serve live customer traffic or to perform other types of meaningful processing, other than the execution of the program and performing the automated tests thereupon. For example, a test host might execute a Web server program that is configured to receive and process test traffic for testing the operation of a program, rather than actual live network requests.

Once the program has been deployed to the test hosts, the deployment component tests the execution of the program on the test hosts utilizing the automated tests specified by the developer. If the automated tests pass, the deployment component may then deploy the program to one or more production hosts in accordance with the deployment rules specified by the developer. Production hosts are computers or virtual machine instances that service live traffic and/or have a primary function other than program testing.

In some implementations the deployment component is also configured to integrate software updates with the testing and deployment of other programs. In these embodiments, the deployment component receives and/or generates a list of available software updates. Software updates include, but are not limited to, operating system updates, security updates, firmware updates, driver updates, shared framework or library updates, and other types of updates.

In some embodiments, an update management system receives software updates, such as operating system updates, and stores the updates in an appropriate update repository. The update management system might then periodically generate a list of the available software updates. After a predefined period of time has elapsed following the generation of the list of available updates, the update management system may provide the list of available updates to the deployment component.

The deployment component is also configured in embodiments to deploy the software updates to one or more test hosts. As discussed above, the test hosts are hardware computing devices or virtual machine instances configured for use in testing the operation of a program. The test hosts are also utilized to test the operation of the program, which may be directly or indirectly dependent upon the software updates, in conjunction with the software updates. In order to provide this functionality, the deployment component performs the automated tests defined for testing the operation of the program on the test hosts having the software updates installed thereupon. In this way, incompatibilities between the program and the software updates may be identified prior to deploying the software updates to production hosts executing the program.

Once the deployment component has completed the automated tests, the deployment component determines whether the automated tests were performed successfully (i.e. the automated tests passed). If the automated tests passed, the deployment component then deploys the software updates to one or more production hosts executing the program. The deployment rules specified for use in deploying the program to the production hosts might also be utilized to deploy the software updates to the production hosts. Additionally, a version of the program (e.g. an updated version) might also be deployed to the production hosts at or around the time the software updates are deployed to the production hosts using the deployment rules. In this way, software updates can be tested and deployed to production hosts in the same manner and utilizing the same infrastructure and deployment rules as other types of programs.

It should be appreciated that the mechanisms disclosed herein might operate in conjunction with a service provider operated network-based distributed computing environment (which may be referred to herein as a "service provider network") through which customers can purchase and utilize computing resources, such as virtual machine instances, data storage resources, database resources, network-accessible services, networking resources, and other types of computing resources on a permanent or as-needed basis. In such an embodiment, a service provider network may provide hardware devices or virtual machine instances for implementing the test hosts and the production hosts. Resources in the service provider network might also be utilized to execute other components described herein, such as the deployment component and/or the update management system. The functionality disclosed herein might also be provided as a service to customers or other users of the service provider network. Additional details regarding the various components and processes described above for integrating software updates with the testing and deployment of other software components will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network architecture diagram showing aspects of one illustrative mechanism described herein for integrating software updates with the testing and deployment of software. As discussed briefly above, an automated software testing and deployment component 104 ("the deployment component") provides functionality for testing and deploying programs created by a software developer to computers that execute the programs. For example, and as described briefly above, a software developer may create a software program 106, along with one or more automated tests 108 for testing the operation of the program 106. The program 106 and/or the automated tests 108 may be created utilizing a suitable programming language. For instance, and without limitation, declarative, functional, imperative, iterative, and scripting languages may be utilized to create the program 106 and/or the automated tests 108.

The developer of the program 106 and the automated tests 108 might also specify one or more deployment rules 110 that specify the manner in which the program 106 is to be deployed following testing. For example, and without limitation, the deployment rules 110 might specify that the program 106 be deployed during off-peak periods of time. The deployment rules 110 might also specify that the program 106 may be deployed only when other types of conditions are satisfied. The deployment rules 110 might be defined utilizing a markup language, such as the extensible markup language ("XML"), or utilizing another appropriate language or data structure. As will be described in greater detail below, the same deployment rules 110 might also be utilized to deploy software updates to computing systems and/or virtual machine instances executing the program 106.

The deployment component 104 might also be configured to deploy the program 106 to one or more test hosts 120A-120N. As discussed briefly above, the test hosts 120A-120N are computers or virtual machine instances that are configured to execute the program 106 and to perform the automated tests 108 on the program. The test hosts 120A-120N are not typically utilized to serve live customer traffic or to perform other types of meaningful processing, other than the execution of the program 106 and performing the automated tests 108 thereupon. For example, a test host 120 might execute a Web server program that is configured to receive and process test traffic for testing the operation of a program, rather than actual live network requests. The test hosts 120A-120N might be referred to herein collectively as a "test fleet" 122.

It should be appreciated that multiple test fleets 122 might be utilized in various embodiments. Each test fleet might be utilized during various testing stages. The test fleets might utilize different software and/or hardware configurations. For example, different test fleets might utilize virtual machine instances having different configurations. Additionally, different types of test network traffic might be routed to the various different test fleets.

Once the program 106 has been deployed to the test fleet 122, the deployment component 104 tests the execution of the program 106 on the test hosts 120 in the test fleet 122 utilizing the automated tests 108 defined by the developer of the program 106. If the automated tests 108 pass, the deployment component 104 may then deploy the program 106 to one or more production hosts 109A-109N in accordance with the deployment rules 110 specified by the developer of the program 106. As mentioned briefly above, the production hosts 109A-109N are computers or virtual machine instances that service live traffic and/or have a primary function other than testing programs. The production hosts 109A-109N might be referred to herein collectively as a "production fleet" 111.

In some implementations the deployment component 104 is also configured to provide functionality for integrating software updates 112 with the testing and deployment of other programs, such as the program 106. As described above, software updates 112 may include, but are not limited to, operating system updates, security updates, driver updates, shared framework or library updates, and other types of updates.

In some embodiments, an update management system 114 receives the software updates 112 and stores the software updates 112 in an appropriate update repository 116. For example, in the case of operating system updates, the update management system 114 might receive the software updates 112 directly from the provider of the operating system to which the software updates 112 apply. In other implementations, the software updates 112 are added to the update repository 116 manually. The software updates 112 might also be obtained and stored in the update repository 116 in another manner.

The update management system 114 is configured to generate a list 118 of the available software updates 112. The update management system 114 might generate the list 118 in response to a user request, on a periodic basis, or in response to another event, such as new software updates 112 becoming available. The list 118 might also be generated in a manner to satisfy certain user-specified criteria, such as a requirement that certain version of a particular library, framework, or other type of component be included in the list 118 of available updates. The update management system 114 might generate the list 118 in response to other types of events and/or stimuli.

Once the list 118 has been generated, the update management system 114 provides the list 118 of available updates 112 to the deployment component 104. In some implementations, the update management system 114 waits a predefined period of time after the list 118 has been generated before providing the list 118 to the deployment component 104. For example, an administrator of the update management system 114 might specify that a list of updates 118 not be provided to the deployment component 104 for two weeks.

Waiting the predetermined period of time before providing the list 118 to the deployment component 104 allows for time to determine if the software updates 112 have problems that need to be addressed prior to deploying the software updates 112. If the software updates 112 are defective in some manner, the list 118 identifying the software updates 112 is not provided to the deployment component 104. Additionally, defective software updates 112 may be removed from the update repository 116 prior to deployment to the test fleet 122 or the production fleet 111.

It should be appreciated that the deployment component 104 might be configured in some embodiments to perform the functionality described above as being performed by the update management system 114. Other components and/or systems might also provide this functionality in other implementations. Additional details regarding the operation of the update management system 114 in one embodiment disclosed herein will be provided below with regard to FIG. 2.

The deployment component 104 is also configured in embodiments to deploy the software updates 112 to test hosts 120A-120N in the test fleet 122. In order to deploy the software updates 112 to the test hosts 120A-120N, the deployment component 104, or another component, might perform various processes. For example, and without limitation, the deployment component 104 might isolate a particular production host 109 by temporarily removing the production host 109 from the production fleet 111. Once the production host 109 has been isolated, the deployment component 104 might stop the execution of the program 106. Once the program 106 has been halted, the software updates 112 may be applied to the production host 109. Once the software updates 112 have been applied, execution of the program 106 may be restarted and the production host 109 may be added back to the production fleet 111. It should be appreciated that these operations are merely illustrative and that operations might be performed in order to apply the software updates 112 to a production host 109. Additionally, these operations might be performed in a different order and not all of these operations might be performed.

Once the software updates 112 have been deployed to the test fleet 122, the deployment component tests the operation of the program 106 on the test hosts 120 to which the software updates 112 have been deployed. In order to provide this functionality, the deployment component 104 utilizes the automated tests 108 defined for testing the operation of the program 106 and described above. Through the use of the automated tests 108, incompatibilities between the program 106 and the software updates 112 may be identified prior to deploying the software updates 112 to the production fleet 111.

Once the automated tests 108 have completed, the deployment component 104 determines whether the automated tests 108 passed. If the automated tests 108 passed, the deployment component 104 then deploys the software updates 112 to one or more production hosts 109A-109N in the production fleet 111 that are also configured to execute the program 106. As described briefly above, the deployment component 104 might also utilize the deployment rules 110 specified for use in deploying the program 106 to deploy the software updates 112 to the production hosts 109. Additionally, a version of the program 106 (e.g. an updated version) might also be deployed to the production hosts 109 in the production fleet 111 at or around the time the software updates 112 are deployed to the production hosts 109, also using the deployment rules 110. In this manner, the software updates 112 can be tested and deployed to production hosts 109 in the production fleet 111 in the same manner and utilizing the same infrastructure and deployment rules 110 as other types of programs, such as the program 106. Additional details regarding the operation of the deployment component 104 in this regard will be provided below with regard to FIG. 3.

It should be appreciate that, in one particular embodiment, the program 106 is a non-operating system component (e.g. a firmware or an application program) and the software updates are updates to components of an operating system. In another particular embodiment, the program 106 is an operating system and the software updates 112 are updates to a non-operating system component (e.g. a firmware or an application program). Through the use of these various configurations, updates to operating system components can be tested with non-operating system programs and updates to non-operating system programs can be tested with operating systems.

As described briefly above, the various mechanisms disclosed herein might operate in conjunction with a service provider network 102, from which customers can purchase and utilize computing resources, such as virtual machine instances or other types of computing resources, from a service provider on a permanent or as-needed basis. For example, in one implementation, the service provider network provides hardware devices or virtual machine instances for implementing the test hosts 120A-120N and the production hosts 109A-109N. Resources provided by the service provider network 102 might also be utilized to execute other components described herein, such as the deployment component 104 and/or the update management system 114. The functionality disclosed herein might also be provided as a service to customers or other users of the service provider network 102.

It should be appreciated that each type or configuration of a computing resource may be available from the service provider network 102 in different sizes. For example, a service provider might offer virtual machine instances or other types of data processing resources that are available for purchase and use that have many different configurations of processor capabilities, main memory, disk storage, and operating system. A service provider might also offer other types of resources for purchase and use by customers. For example, a service provider might offer hardware devices, database resources, file or block data storage resources, and/or networking resources, such as load balancing resources, domain name service ("DNS") resources, virtual private cloud ("VPC") resources, virtual local area network ("VLAN") resources, and/or other types of hardware and software computing resources on a permanent or as-needed basis. Details regarding several illustrative configurations for certain types of data processing resources will be provided below with regard to FIG. 6.

The service provider operating the service provider network 102 might also charge a fee for operating the resources to a customer that creates and uses the resources. The fee charged for a particular resource might be based upon the type and/or configuration of the resource. The fee charged for a particular resource might also be based upon the amount of time the resource is utilized. For example, in the case of a data processing resource, like a virtual machine instance, the fee for use of the resource might be charged based upon the amount of time the resource is utilized. In the case of a data storage resource, the fee might be computed based upon the amount of data stored and/or the amount of data transferred into or out of the resource. The fees for other types of resources might also be based upon other considerations. For example, in an embodiment wherein the functionality described herein for deploying software updates 112 is provided as a service, the service provider might take various considerations into account when determining an amount, if any, to charge for the service. A service provider might also utilize various purchasing models to determine the amount to charge a customer for use of resources provided by the service provider network 102. Details regarding several illustrative purchasing models utilized with certain types of resources will also be described below with regard to FIG. 6.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks ("WANs"), such as the Internet. In the environment shown in FIG. 1, a service provider might operate one or more data centers configured to provide the resources in the service provider network 102, such as the test hosts 120A-120N and the production hosts 109A-109N. Details regarding one implementation of a service provider network 102 will be provided below with regard to FIGS. 4 and 5.

The various resources described above might also be provisioned and de-provisioned as needed in an automated fashion. For example, a customer might submit a request to the service provider network 102 to instantiate a new instance of a computing resource, such as an instance of a virtual machine to be utilized as a test host 120 or a production host 109. In response to receiving such a request, a provisioning component (not shown in FIG. 1), or one or more other components within the service provider network 102, might create the new instance of the virtual machine as requested by the customer. The customer may then be permitted to utilize the new instance of the virtual machine as desired, such as in the manner described above.

When the customer has finished using the virtual machine instance, the customer may request that the virtual machine instance be de-provisioned. In response thereto, the provisioning component, or another component in the service provider network 102, may cause the virtual machine instance to be de-provisioned. Other types of computing resources might also be provisioned and de-provisioned in a similar manner. This may be desirable, for instance, in order to provision the test hosts 120A-120N in the test fleet 122 on an as-needed basis. The test hosts 120A-120N can then be de-provisioned when the testing has been completed. The service provider network 102 might also provide functionality for automatically scaling and/or de-scaling resources based upon demand for the resources 508 or other factors. The service provider network 102 might also provide other functionality not specifically described herein.

Figure 2:
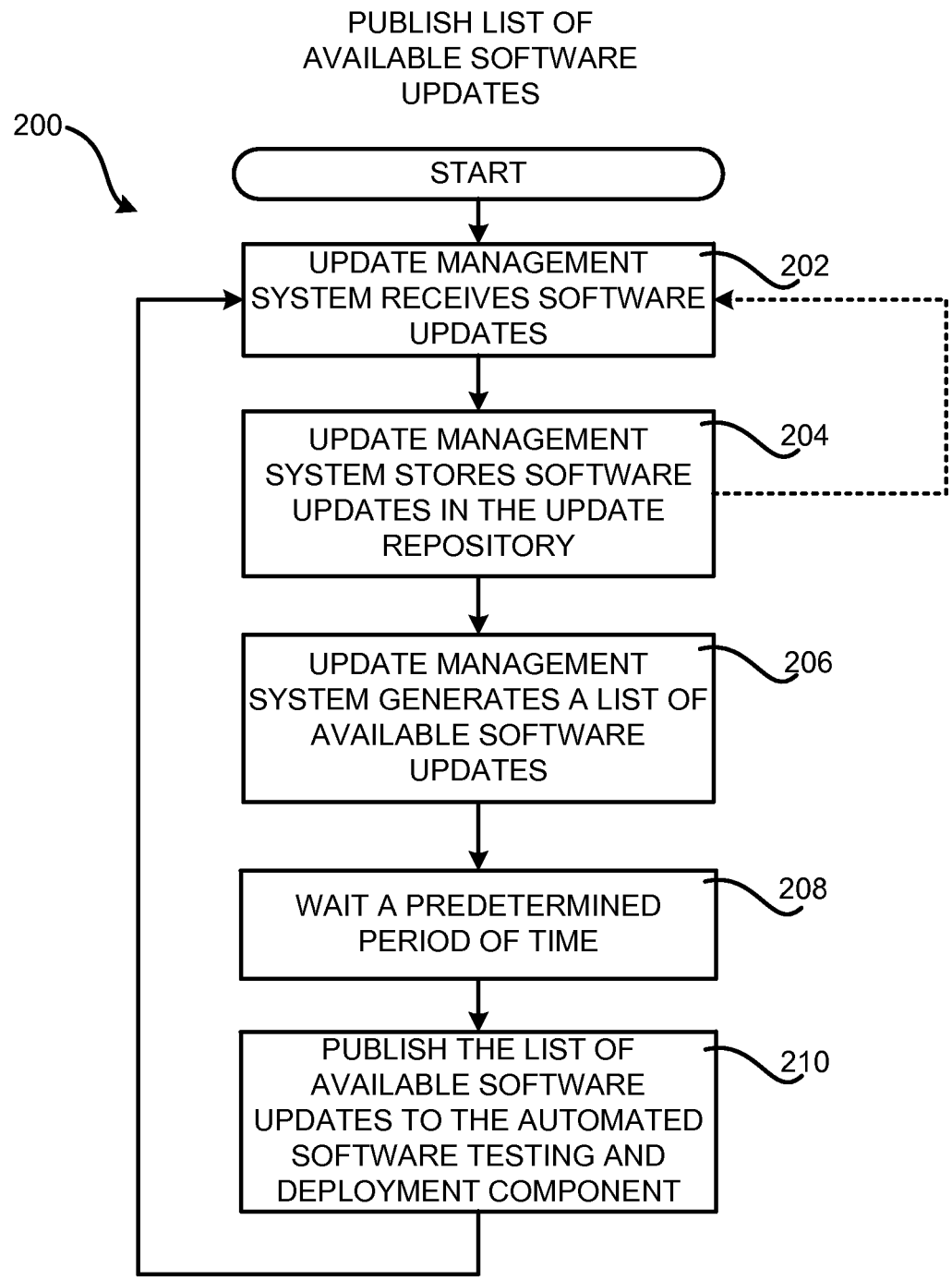
FIG. 2 is a flow diagram illustrating aspects of the operation of an update management system for generating a list of available software updates, according to one embodiment disclosed herein.

FIG. 2 is a flow diagram showing a routine 200 that illustrates aspects of the operation of the update management system 114 for generating a list of available updates 118, according to one embodiment disclosed herein. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system. Moreover, and as described above, other components such as the deployment component 104 might perform some or all of the functionality described with regard to FIG. 2 as being performed by the deployment component 104.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the update management system 114 receives software updates 112. As discussed above, the software updates 112 might be periodically provided to the update management system 114, such as by the provider of an operating system for instance. From operation 202, the routine 200 proceeds to operation 204, where the update management system 114 receives the software updates 112 and stores the software updates 112 in the update repository 116. The update repository 116 might be any type of data store suitable for storing the software updates 112. The dashed line in FIG. 1 from operation 204 to operation 202 indicates that the update management system 114 might continually receive software updates 112 and store the software updates 112 in the update repository 116.

From operation 204, the routine 200 proceeds to operation 206, where the update management system 114 generates a list 118 of the available software updates 112. As mentioned above, the update management system 114 might generate the list 118 in response to a user request, on a periodic basis, or in response to another event, such as new software updates 112 becoming available. The update management system 114 might also generate the list 118 in response to other types of events and/or stimuli.

From operation 206, the routine 200 proceeds to operation 208, where the update management system 114 waits a predefined period of time after the list 118 has been generated. For example, and as mentioned briefly above, an administrator of the update management system 114 might specify that a list of updates 118 not be provided to the deployment component 104 for two weeks or another time period. Waiting a predefined period of time before providing the list 118 to the deployment component 104 allows time to determine if the software updates 112 have problems that need to be addressed prior to deploying the software updates 112. If the software updates 112 are defective in some manner, the list 118 of available software updates 112 is not provided to the deployment component 104 and the software updates 112 may be removed from the update repository 116 prior to deployment to the test fleet 122 or the production fleet 111.

Once the predefined period of time has passed, the routine 200 proceeds from operation 208 to operation 210. At operation 210, the update management system 114 publishes the list 118 of available software updates 112 to the deployment component 104. The deployment component 104 may then deploy the software updates 112 in the manner described below with regard to FIG. 3. From operation 210, the routine 200 proceeds back to operation 202, where the process described above may be repeated in order to process additional software updates 112 in a similar fashion.

Figure 3:
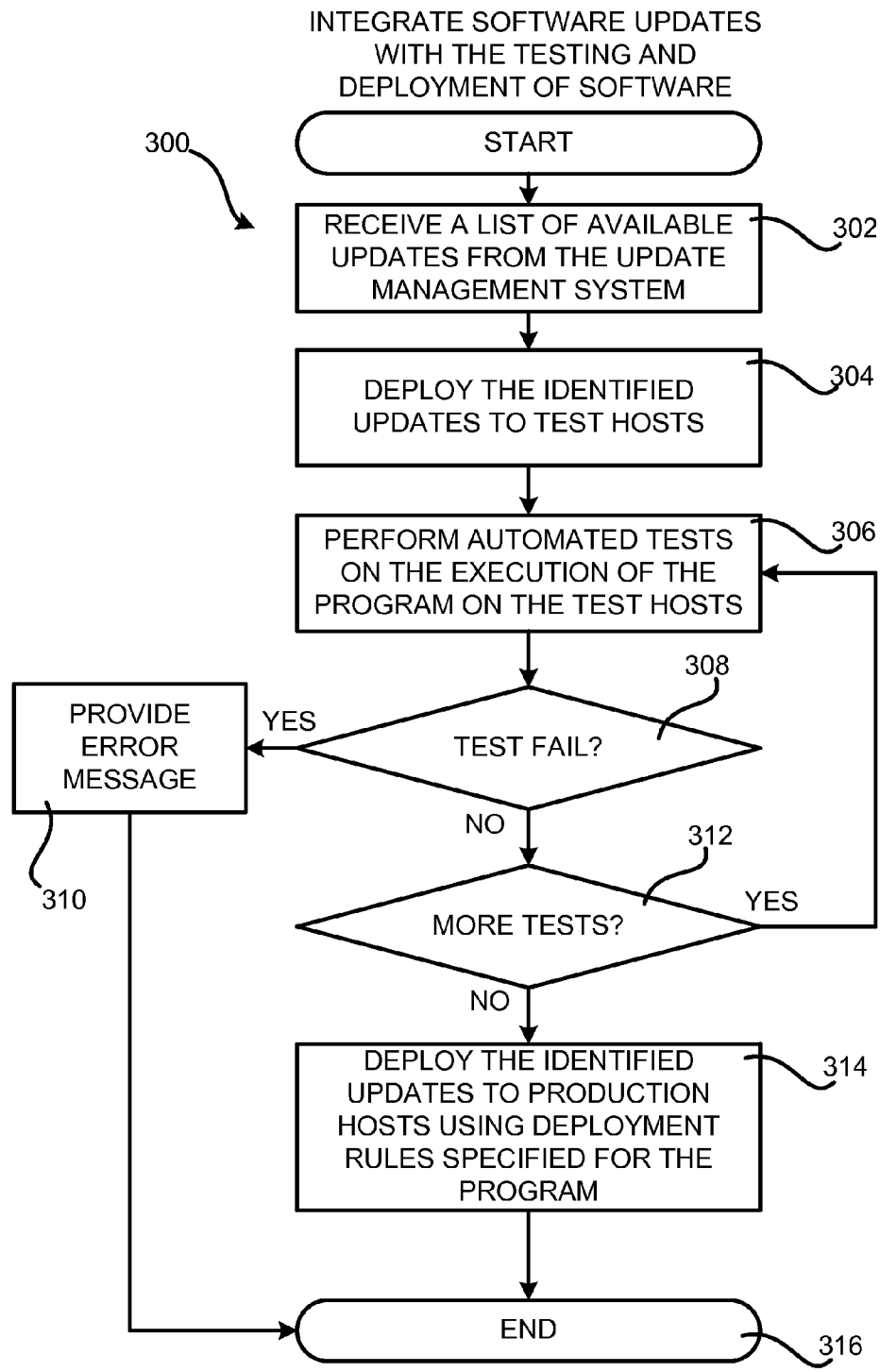
FIG. 3 is a flow diagram illustrating aspects of the operation of an automated software testing and deployment component for integrating software updates with the testing and deployment of software, according to one embodiment disclosed herein.

FIG. 3 is a flow diagram showing a routine 300 that illustrates aspects of the operation of the deployment component 104 for integrating software updates 112 with the testing and deployment of a program 106, according to one embodiment disclosed herein. The routine 300 begins at operation 302, where the deployment component 104 receives the list 118 of available updates 112 from the update management system 114. The routine 300 then proceeds to operation 304, where the deployment component 104 deploys the software updates 112 identified in the list 118 to test hosts 120A-120N in the test fleet 122. As mentioned above, the test hosts 120A-120N are also provisioned with the program 106. In this regard, the deployment component 104 might deploy the program 106 to the test hosts 120A-120N in advance of, at the same time as, or following the deployment of the software updates 112.

From operation 304, the routine 300 proceeds to operation 306, where the deployment component 104 initiates the automated tests 108 of the program 106 on the test hosts 120A-120N to which the software updates 112 have been deployed. As mentioned above, the automated tests 108 are configured to test various aspects of the execution of the program 106. If deployment of the software updates 112 causes the program 106 to execute improperly, the automated tests 108 will fail.

From operation 306, the routine 300 proceeds to operation 308, where the deployment component 104 determines if one or more of the automated tests 108 have failed. If one of the automated tests 108 fails, the routine 300 proceeds from operation 308 to operation 310 where an error message may be provided. Other types of messages may be provided and other types of actions may be taken in response to the failure of one of the automated tests 108. From operation 310, the routine 300 then proceeds to operation 316, where it ends.

If, at operation 308, the deployment component 104 determines that an automated test has not failed, the routine 300 proceeds from operation 308 to operation 312. At operation 312, the deployment component 104 determines if more automated tests 108 remain to be performed. If additional automated tests 108 remain to be performed, the routine 300 proceeds back to operation 306, described above. If no additional automated tests 108 remain to be performed, the routine 300 proceeds from operation 312 to operation 314.

At operation 314, the deployment component 104 deploys the software updates 112 to production hosts 109A-109N in the production fleet 111 that are also executing the program 106. As mentioned above, the software updates 112 are deployed utilizing the same deployment rules 110 utilized to deploy the program 106 to the production hosts 109. In another implementation, different deployment rules 110 might be specified for the automated deployment of the software updates 112 to the production fleet 111. Additionally, and as described briefly above, the deployment component 104 might also deploy an updated version of the program 106 to the production fleet 111 at or around the time that the software updates 112 are deployed. In this way, the deployment component 104 may ensure that compatible versions of the program 106 and the software updates 112 are present on the production hosts 109A-109N in the production fleet 111. From operation 314, the routine 300 proceeds to operation 316, where it ends.

It should be appreciated that the mechanism described above might also be utilized to test the operation of the program 106 with hardware versions. For example, in another implementation, the deployment component 104 might deploy the program 106 to test hosts 120 having different hardware versions. The deployment component 104 might then test the operation of the program 106 on the different hardware versions using the automated tests 108. The deployment component 104 may then deploy the program 106 to production hosts 109 having hardware configurations for which the execution of the program 106 was tested and passed. In this way, the deployment component 104 might be configured to prevent deployment of the program 106 to computing systems having hardware configurations that are not compatible with the program 106. The deployment component 104 might also provide other types of functionality in other embodiments.

Figure 4:
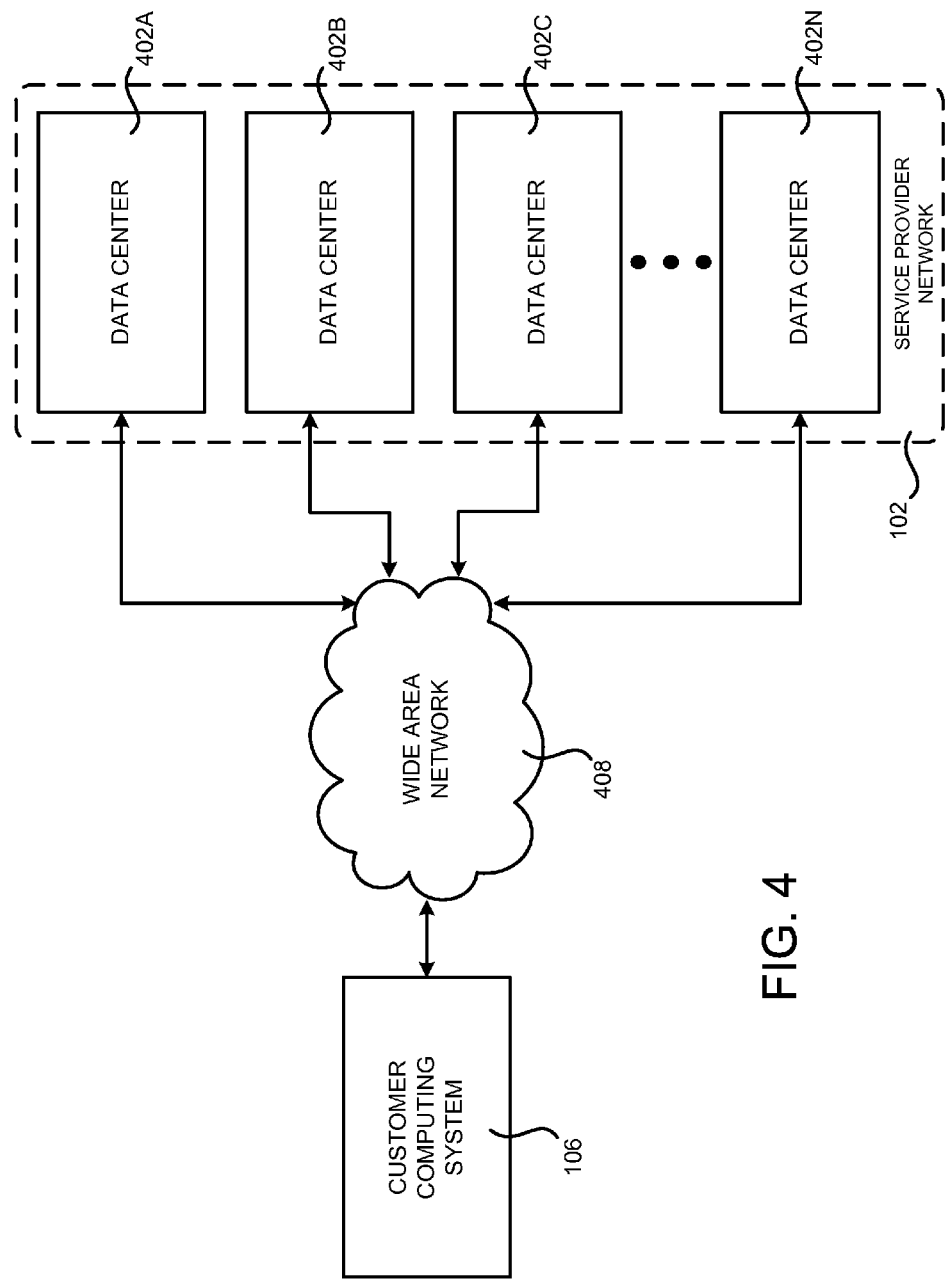
FIG. 4 is a system and network diagram that shows one illustrative operating environment for the embodiments disclosed herein that includes a service provider network that may be configured to provide aspects of the functionality described herein for integrating software updates with the testing and deployment of software.

FIG. 4 is a system and network diagram that shows one illustrative operating environment for the embodiments disclosed herein that includes a service provider network 102 that may be configured to provide functionality for hosting hardware devices and/or virtual machine instances that implement the test fleet 122 and the production fleet 111, according to embodiments disclosed herein. The service provider network 102 might also provide other types of computing resources that are utilized to implement the update management system 114, the deployment component 104, and/or any of the other components described herein.

As discussed briefly above, the service provider network 102 can provide computing resources on a permanent or an as-needed basis. The computing resources provided by the service provider network 102 may include various types of computing resources, such as data processing resources, data storage resources, networking resources, data communication resources, and the like.

Each type of computing resource may be general-purpose or may be available in a number of specific configurations. For example, and as described briefly above, data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like. Additional details regarding some types of computing resources that may be offered for use through a service provider network 102 will be provided below with regard to FIG. 6.

The computing resources provided by the service provider network 102 are enabled in one implementation by one or more data centers 402A-402N (which may be referred herein singularly as "a data center 402" or in the plural as "the data centers 402"). The data centers 402 are facilities utilized to house and operate computer systems and associated components. The data centers 402 typically include redundant and backup power, communications, cooling, and security systems. The data centers 402 might also be located in geographically disparate locations. One illustrative configuration for a data center 402 that implements the concepts and technologies disclosed herein for integrating software updates with the testing and deployment of software will be described below with regard to FIG. 5.

The customers and other users of the service provider network 102 may access the computing resources provided by the service provider network 102 over a WAN 408. Although a WAN 408 is illustrated in FIG. 4, it should be appreciated that a local-area network ("LAN"), the Internet, or any other networking topology known in the art that connects the data centers 402 to remote customers and other users may be utilized. It should also be appreciated that combinations of such networks might also be utilized.

Figure 5:
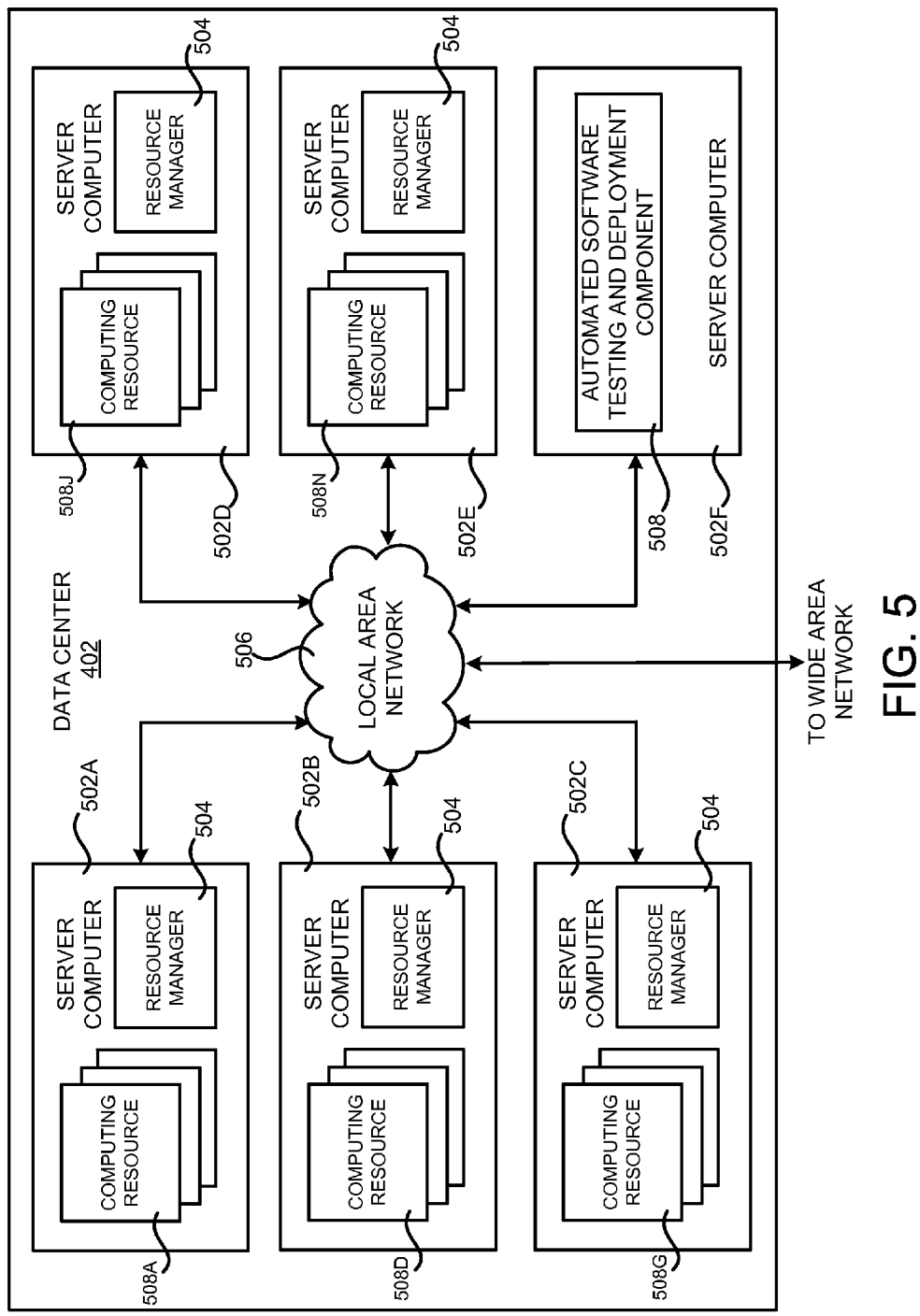
FIG. 5 is a computing system diagram that illustrates one configuration for a data center that implements aspects of the concepts and technologies disclosed herein for integrating software updates with the testing and deployment of software, according to one embodiment disclosed herein.

FIG. 5 is a computing system diagram that illustrates one configuration for a data center 402 that implements aspects of the operation of the service provider network 102, according to one embodiment disclosed herein. The example data center 402 shown in FIG. 5 includes several server computers 502A-502F (which may be referred to herein singularly as "a server computer 502" or in the plural as "the server computers 502") for providing computing resources 508.

The server computers 502 may be standard tower, rack-mount, or blade server computers configured appropriately for providing the computing resources 508 described herein. For example, in one implementation the server computers 502 are configured to provide the computing resources 508A-508N. As mentioned above, the computing resources 508 might be data processing resources, data storage resources, database resources, networking resources, and others. Some of the servers 502 might also be configured to execute a resource manager 504 capable of instantiating and/or managing resources 508. In the case of virtual machine instances, for example, the resource manager 504 might be a hypervisor or another type of program configured to enable the execution of multiple virtual machine instances on a single server computer 502, for example.

The data center 402 shown in FIG. 5 also includes a server computer 502F that may be reserved for executing various software components for managing the operation of the data center 402, the server computers 502, and the computing resources 508. In some embodiments, such as the embodiment described above with regard to FIG. 1, the server computer 502F might also be configured to execute the deployment component 104. Other computing systems within the data center 402 might also be utilized to execute this component.

In the example data center 402 shown in FIG. 5, an appropriate LAN 506 is utilized to interconnect the server computers 502A-502F. The LAN 506 is also connected to the WAN 408 illustrated in FIG. 4. It should be appreciated that the configuration and network topology illustrated in FIGS. 1-5 has been greatly simplified and that many more computing systems, networks, and networking devices may be utilized to interconnect the various computing systems disclosed herein and to provide the functionality described above.

Appropriate load balancing devices or software modules might also be utilized for balancing a load between each of the data centers 402A-402N, between each of the server computers 502A-502F in each data center 402, and, potentially, between computing resources 508 in each of the data centers 402. It should be appreciated that the data center 402 described with respect to FIG. 5 is merely illustrative and that other implementations might be utilized.

Figure 6:
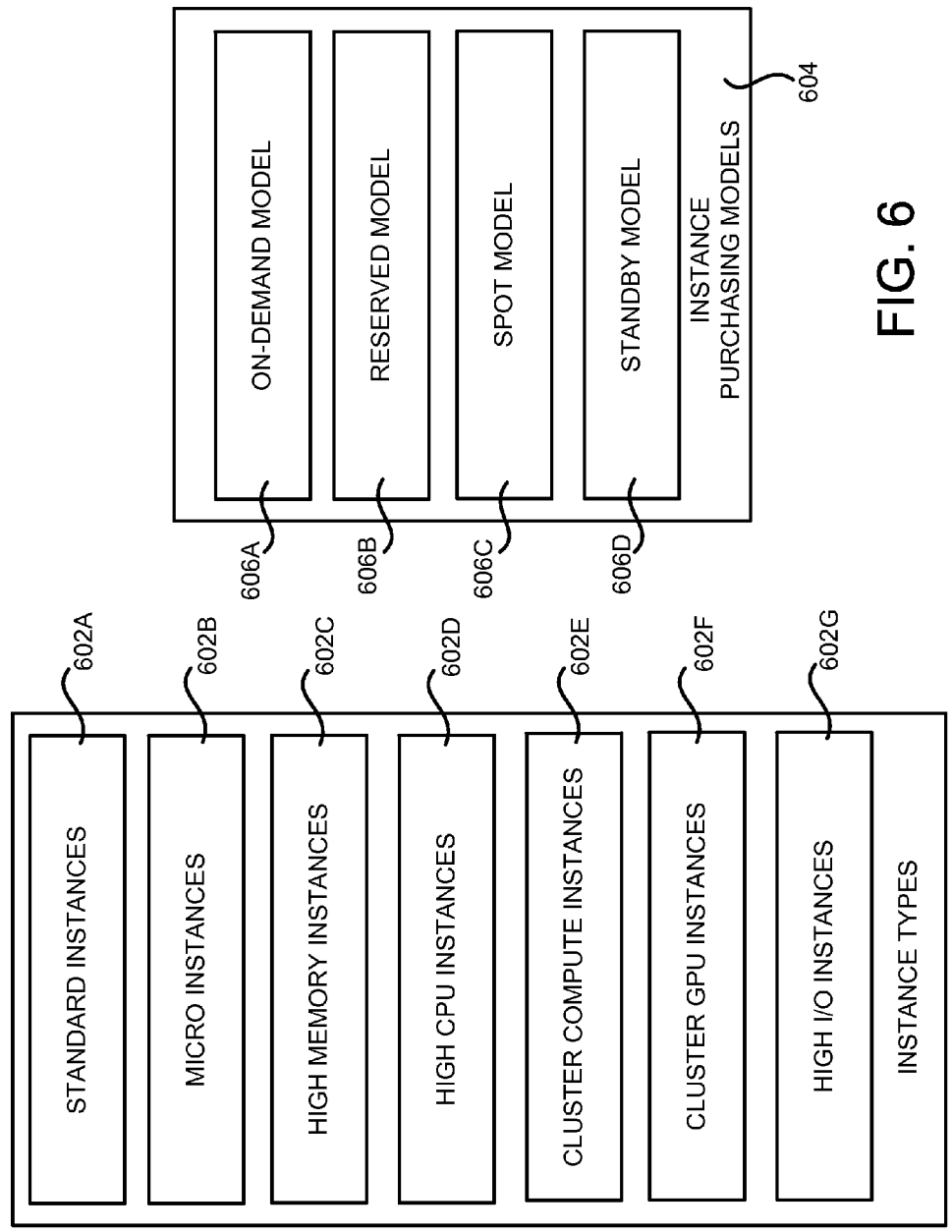
FIG. 6 is a block diagram showing aspects of various types of computing resources and purchasing models for the computing resources that might be provided by a computing service provider and utilized in embodiments disclosed herein.

FIG. 6 is a block diagram showing aspects of various types of computing resources 508 and purchasing models for the computing resources 508 that might be provided by a service provider network 102 and utilized in embodiments disclosed herein. As described briefly above, one example of the computing resources 508 that might be provided by a service provider network 102 are data processing resources, such as virtual machine instances. The virtual machine instances provided by the service provider network 102 may be made available to customers in a number of different types, or configurations. FIG. 6 illustrates several example instance types that might be made available by a service provider through a service provider network 102: standard instances; micro instances; high memory instances; high central processing unit ("CPU") instances; cluster compute instances; cluster graphics processing unit ("GPU") instances, and high input/output ("I/O") instances. Aspects of each of these instance types will be described below.

Standard instances 602A are instances that are configured with generally proportional amounts of CPU and memory. Standard instances 602A may be suitable for common computing applications. Standard instances 602A may be made available in various sizes in some embodiments. For example, "small", "medium", "large", and "extra large" instances may be made available, with each of these instances having greater amounts of CPU and memory, while maintaining approximately similar ratios of CPU to memory.

Micro instances 602B are instances that provide a small amount of consistent CPU resources and allow CPU capacity to be increased in short bursts when additional cycles are available. Micro instances 602B may be suited for lower throughput applications and Web sites that require additional compute cycles periodically.

High memory instances 602C are instances that have proportionally more random access memory ("RAM") resources than CPU resources. High memory instances 602C may be suitable for high throughput applications, including database and memory caching applications. In contrast, high CPU instances 602D have proportionally more CPU resources than RAM memory resources and are well suited for compute-intensive applications.

Cluster compute instances 602E are instances that offer proportionally high CPU resources with increased network performance. Cluster compute instances 602E are well suited for High Performance Compute ("HPC") applications and other demanding network-bound applications. Cluster GPU instances 602F are virtual machine instances that provide general-purpose GPUs with proportionally high CPU and increased network performance for applications benefiting from highly parallelized processing, including HPC, rendering and media processing applications. While cluster compute instances 602E provide the ability to create clusters of instances connected by a low latency, high throughput network, cluster GPU instances 602F provide an additional option for applications that can benefit from the efficiency gains of the parallel computing power of GPUs over what can be achieved with traditional processors.

High I/O instances 602G are instances that provide very high disk I/O performance and are suited for high performance database workloads and other jobs that require high disk performance. High I/O instances 602G may utilize solid state-drive ("SSD")-based local instance storage for high I/O throughput. High I/O instances 602G might also provide high levels of CPU, memory, and network performance. It should be appreciated that the various instance types described above are merely illustrative. Other instance types not described herein might be utilized with the various concepts and technologies described herein. Additionally, in some embodiments, virtual machine instances may be made available in various sizes having continuous ratios of CPU to memory.

It should also be appreciated that the various instance types described above might be utilized with various operating systems. For example, a customer of a service provider might request to execute a high CPU instance 602D executing the LINUX operating system. Similarly, a customer or other user of the service provider network 102 might request to use a cluster compute instance 602E executing the MICROSOFT WINDOWS SERVER operating system. Other operating systems might also be utilized.

As also shown in FIG. 6, the various instance types described above, and the other computing resources 508 described herein, might be priced according to various instance purchasing models 604. For instance, in the example shown in FIG. 6, computing resources 508 may be priced according to an on-demand model 606A, a reserved model 606B, a spot model 606C, and/or a standby model 606D. Aspects of each of these purchasing models are described in greater detail below.

Computing resources 508 priced according to the on-demand model 606A are resources that are paid for and in active use by a customer. The on-demand model 606A allows customers of a service provider to pay for capacity per unit of time, such as an instance-hour, without requiring a long-term commitment. This may free the customer from the costs and complexities of planning, purchasing, and maintaining hardware, and might effectively transform what are commonly large fixed costs into much smaller variable costs.

Computing resources 508 priced according to the reserved model 606B are computing resources 508 that are reserved for a customer in exchange for a payment. The reserved model 606B provides a customer the option to make a one-time payment for each resource 508 they want to reserve. In turn, the customer may receive a discount on the hourly usage charge for reserved computing resources 508 as compared to on-demand resources. After the customer makes the one-time payment for reserved computing resources 508, the reserved resources are reserved for the customer and the customer has no further obligation. The customer may choose to run the reserved resources 508 for the discounted usage rate for the duration of a chosen term. If the customer does not use the reserved resources, the customer will not pay usage charges on these resources 508.

The spot model 606C allows customers to bid on unused capacity in a service provider network 102. The customer can run the resources 508 priced according to the spot model 606C for as long as their bid exceeds a current market price, called the "spot market price". The spot market price may fluctuate based upon the supply of resources and the customer demand for the resources. Spot resources may be terminated if a customer's maximum bid no longer exceeds the current spot market price.

In order to obtain spot resources, a customer may place a request for spot resources that specifies the type and desired number of spot resources and the maximum price the customer is willing to pay. If the customer's maximum price bid exceeds the current spot market price for desired resources, the customer's request will be fulfilled and the customer's spot resources will run until either the customer chooses to terminate them or the spot market price increases above the customer's maximum price (whichever is sooner). Various components operating within a service provider network 102 may manage the market for the spot resources, including setting the current spot market price.

Computing resources 508 purchased according to the standby model 606D, which might be referred to as "standby resources", are resources 508 that have been acquired on behalf of a customer and that are made ready for near immediate use by the customer in the manner described herein. The price charged for standby resources is typically less than the price charged for on-demand resources, since the standby resources may be terminated in the same manner as spot resources. In one embodiment, standby resources are priced higher than spot resources and reserved resources, but lower than on-demand resources.

It should be appreciated that the various purchasing models 604 described above are merely illustrative and that other mechanisms may be utilized to set the pricing for the various types of computing resources 508 provided by a service provider network 102. It should also be appreciated that the embodiments disclosed herein may be utilized with any of the resource types and purchasing models 604 shown in FIG. 6 and other configurations of computing resources 508 and purchasing models 604 not shown in FIG. 6 or described herein. Additionally, it should be appreciated that other types of computing resources 508 might also be priced according to the purchasing models 604 shown in FIG. 6 or other purchasing models. As discussed above, the embodiments disclosed herein might also be utilized with other types of computing resources 508, such as data storage resources, database resources, networking resources, and others. These resources might also be available in various configurations, capacities, arrangements, and priced according to various purchasing models.

Figure 7:
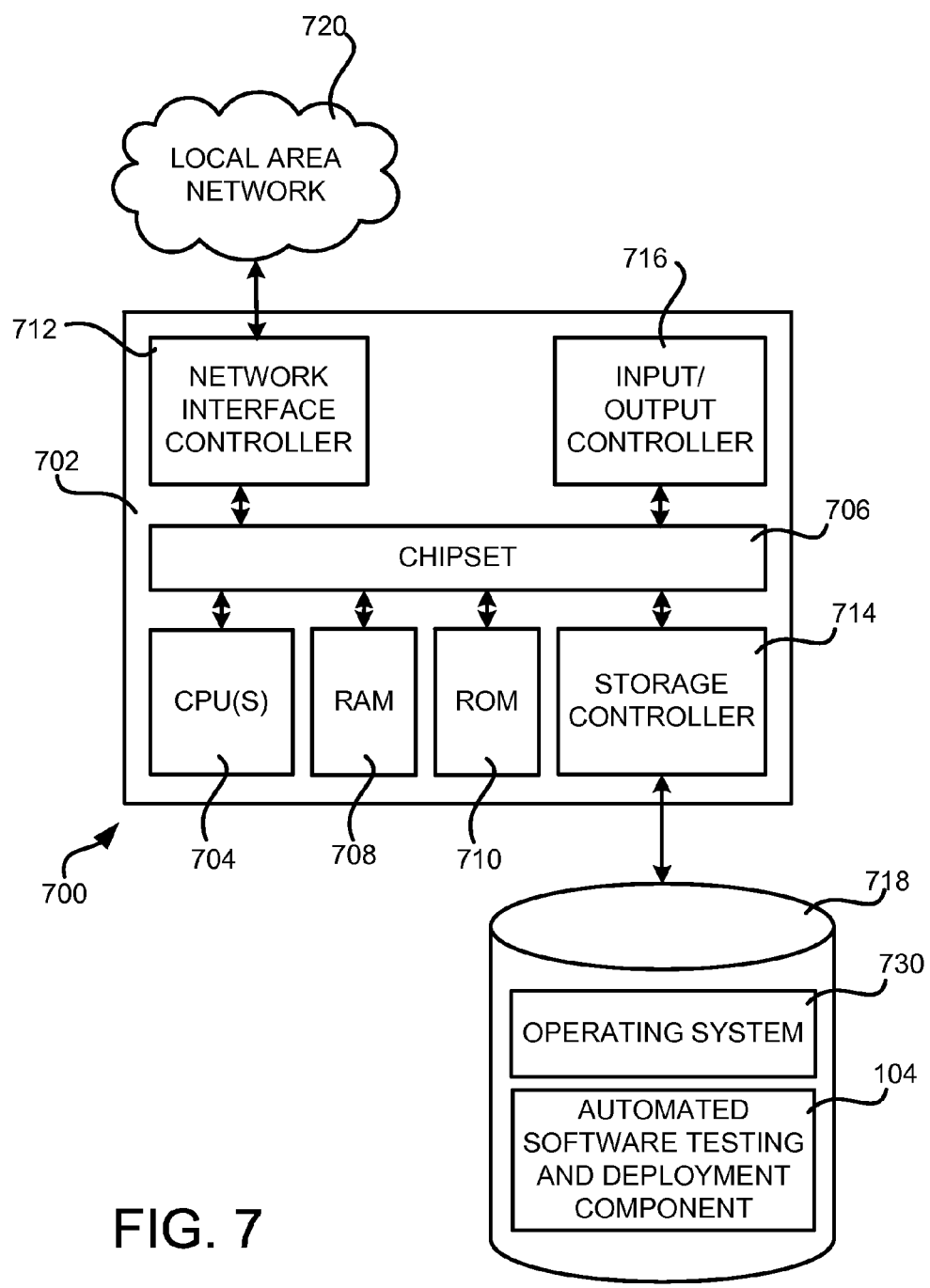
FIG. 7 is a computer architecture diagram showing an illustrative computer hardware architecture for implementing a computing device that might be utilized to implement aspects of the various embodiments presented herein.

FIG. 7 shows an example computer architecture for a computer 700 capable of executing the program components described above for integrating software updates 112 with the testing and deployment of software. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 7 may be utilized to execute the program 106, the deployment component 104, the automated tests 108, and/or the other software components shown in FIG. 1, and described above.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a network interface controller ("NIC") 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached Small Computer System Interface ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700, such as the deployment component 104, programs for implementing the functionality of the update management system 114, and/or any of the other software components and data described above. The mass storage device 718 might also store other programs and data not specifically identified herein.

In one embodiment, the mass storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various routines described above with regard to FIGS. 2 and 3. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7 such as a GPU, or may utilize an architecture completely different than that shown in FIG. 7.

Based on the foregoing, it should be appreciated that technologies for integrating software updates with the testing and deployment of software have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for integrating updates with testing and deployment of a first program, the method comprising performing computer-implemented operations for:

deploying the first program to one or more production hosts using one or more deployment rules defined for use in deploying the first program to the one or more production hosts, the one or more deployment rules specifying one or more of a time period to perform deployment or a condition under which deployment occurs, and maintaining a copy of the first program on one or more test hosts for one or more automated tests for subsequent compatibility analysis:

identifying updated software components for one or more other programs that are different from the first program:

deploying the updated software components for the one or more other programs that are different from the first program to the one or more test hosts having the copy of the first program installed thereupon;

in response to deploying the updated software components to the one or more test hosts, performing one or more automated tests for subsequent compatibility analysis on execution of the first program maintained on the one or more test hosts;

receiving, separately from the updated software components, changes to the first program;

determining, based upon the automated tests for subsequent compatibility analysis, that the first program executed properly on the one or more test hosts; and in response to determining that the first program executed properly on the one or more test hosts, deploying the updated software components for the one or more other programs in conjunction with deploying the changes to the first program to the one or more production hosts executing the first program using the one or more deployment rules specified for deploying the first program.

2. The computer-implemented method of claim 1, wherein the performing, determining, and deploying the updated software components operations are performed by an automated software testing and deployment component also configured to deploy the first program to the one or more test hosts and to deploy the program to the one or more production hosts using the deployment rules.

3. The computer-implemented method of claim 1, wherein the deployment rules further specify the manner in which the first program is to be deployed to the one or more production hosts.

4. The computer-implemented method of claim 1, further comprising:

generating a list of the updated software components; and waiting a predefined time period after generating the list of updated software components before deploying the updated software components to the one or more test hosts and performing the automated tests on the first program executing on the one or more test hosts.

5. The computer-implemented method of claim 1, wherein the changes to the first program comprise one or more updates to the first program.

6. The computer-implemented method of claim 1, wherein the updated software components comprise one or more of updates to an operating system, security updates, driver updates, framework updates, and shared library updates.

7. The computer-implemented method of claim 1, wherein the changes to the first program comprise an updated version of the first program.

8. A computer-readable storage medium having computer-executable instructions stored thereupon which, when executed by a computer, cause the computer to:
  perform, by way of an automated software testing and deployment component, one or more automated tests on execution of a first program on one or more test hosts before deploying the first program to one or more production hosts;
  in response to the first program passing the one or more automated tests on one or more test hosts, deploy, by way of the automated software testing and deployment component, the first program to the one or more production hosts based on results of the one or more automated tests and utilizing deployment rules specified for deploying the first program to the one or more production hosts, the deployment rules specifying one or more of a time period to perform deployment or a condition under which deployment occurs, and maintain the first program on the one or more test hosts for one or more automated tests for subsequent compatibility analysis:
  receive, at the automated software testing and deployment component, a list of available software updates for one or more other programs executing on the one or more test hosts and the one or more production hosts, the one or more other programs being different from the first program;
  deploy, by way of the automated software testing and deployment component, the software updates for the one or more other programs to the one or more test hosts;
  in response to deploying the software updates to the one or more test hosts, perform, by way of the automated software testing and deployment component, the one or more automated tests for subsequent compatibility analysis on the first program maintained on the one or more test hosts with the deployed software updates;
  receive, separately from the software updates, changes to the first program at the automated software testing and deployment component;
  determine, by way of the automated software testing and deployment component, that the one or more automated tests for subsequent compatibility analysis have passed; and
  in response to determining that the one or more tests for subsequent compatibility analysis have passed, deploy the software updates for the one or more other programs in conjunction with deploying the changes to the first program, using the deployment rules specified for deploying the first program to the one or more production hosts, to the one or more production hosts by way of the automated software testing and deployment component.

9. The computer-readable storage medium of claim 8, wherein the software updates comprise one or more updates to an operating system upon which the first program executes.

10. The computer-readable storage medium of claim 8, having further computer-executable instructions stored thereupon which, when executed by the computer, cause the computer to:
  identify the software updates; and
  provide a list of the software updates to the automated software testing and deployment component after a predefined period of time has elapsed following the identification of the software updates.

11. The computer-readable storage medium of claim 8, wherein the one or more test hosts comprise virtual machine instances provided by a service provider network.

12. The computer-readable storage medium of claim 8, wherein the software updates comprise one or more updates to security updates, driver updates, framework updates, and shared library updates.

13. A system for integrating updates with testing and deployment of a first program, the system comprising:
  one or more processors; and
  at least one computer-readable storage medium having instructions stored thereupon which are executable by the one or more processors and which, when executed, cause the system to:
  deploy the first program to one or more production hosts using deployment rules defined for use in deploying the first program to the production hosts, the deployment rules specifying one or more of a time period to perform deployment or a condition under which deployment occurs, and maintain a copy of the first program on one or more test hosts for one or more automated tests for subsequent compatibility analysis,
  identify updates to one or more components of a second program upon which execution of the first program is dependent, the second program being different from the first program,
  deploy the updates to the one or more components to the one or more test hosts having the copy of the first program installed thereupon,
  in response to deploying the updates to the one or more test hosts, perform one or more automated tests for subsequent compatibility analysis of the first program on the one or more test hosts with the deployed updates,
  receive, separately from the updates to the one or more components, changes to the first program at an automated software testing and deployment component,
  determine that the one or more automated tests for subsequent compatibility analysis passed, and
  in response to determining that the one or more automated tests for subsequent compatibility analysis passed, cause the updates to the one or more components to be deployed in conjunction with deploying the changes to the first program to the one or more production hosts executing the program using the deployment rules defined for use in deploying the first program to the production hosts.

14. The system of claim 13, wherein the computer-readable storage medium has further computer-executable instructions stored thereupon which, when executed by the processor, cause the system to wait a predefined period of time after identifying the updates to the one or more components before deploying the one or more updates to the one or more test hosts.

15. The system of claim 13, wherein the computer-readable storage medium has further computer-executable instructions stored thereupon which, when executed by the processor, cause the system to generate a list of available updates in response to new updates becoming available.

16. The system of claim 13, wherein the computer-readable storage medium has further computer-executable instructions stored thereupon which, when executed by the processor, cause the system to generate a list of available updates in response to receiving a user request to generate the list of available updates.

17. The system of claim 13, wherein the updates comprise updates to an operating system upon which the program executes and wherein the program comprises a non-operating system component.

18. The system of claim 13, wherein the updates comprise updates to one or more non-operating system components and wherein the program comprises an operating system.

19. The system of claim 13, wherein at least one of the test hosts or the production hosts comprise virtual machine instances provided by a service provider network.

20. The system of claim 13, wherein the updates comprise one or more updates to security updates, driver updates, framework updates, and shared library updates.

* * * * *